May 31, 1932.                F. A. HUFF                1,861,056
                        HYDRAULIC SHOCK ABSORBER
                    Filed Aug. 22, 1928      2 Sheets-Sheet 1
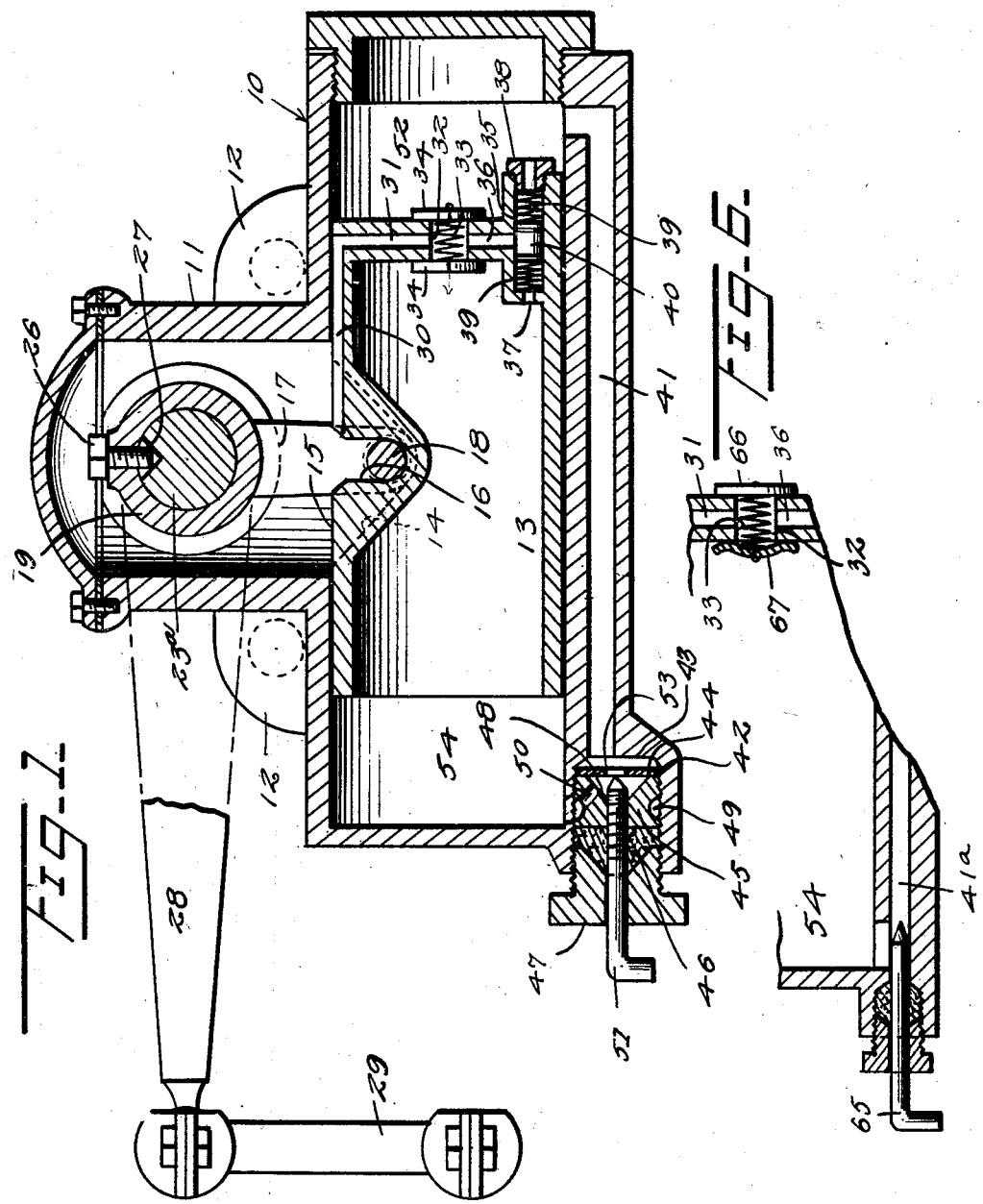
Inventor
F. A. Huff
By Watson E. Coleman
Attorney May 31, 1932.  F. A. HUFF  1,861,056
HYDRAULIC SHOCK ABSORBER
Filed Aug. 22, 1928    2 Sheets-Sheet 2
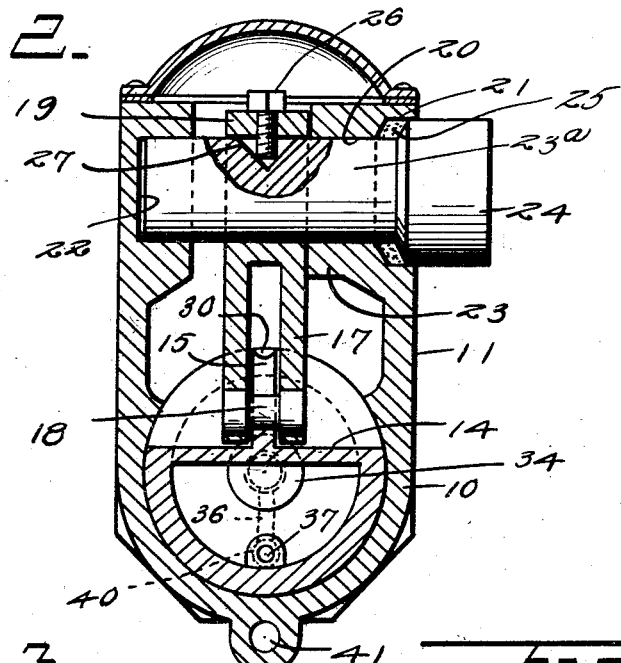
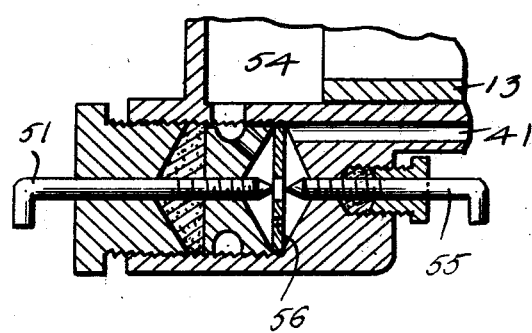
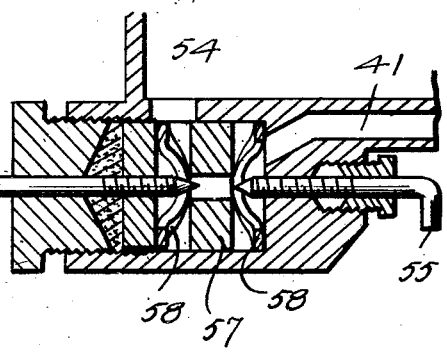
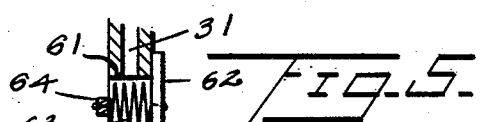
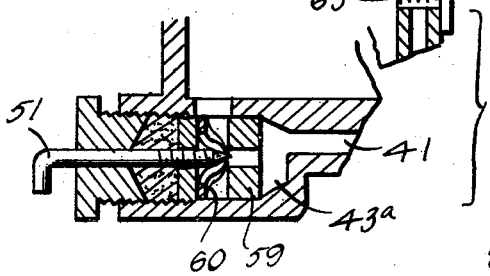
Inventor
F. A. Huff
By Watson E. Coleman
Attorney Patented May 31, 1932

1,861,056

UNITED STATES PATENT OFFICE

FLOYD A. HUFF, OF MANSFIELD, OHIO

HYDRAULIC SHOCK ABSORBER

Application filed August 22, 1928. Serial No. 301,320.

This invention relates to hydraulic shock absorbers and more particularly to the construction of the fluid by-passes of such devices.

An important object of the invention is to provide a construction which will eliminate the tendency of hydraulic shock absorbers having a simple by-pass to block or buck under severe strains which cause excessive pressures in the pressure chambers thereof.

A further object of the invention is to provide a shock absorber having a simple by-pass and means associated with this by-pass for automatically varying the size of the by-pass in accordance with the pressure generated in the pressure chamber, so that the resistance to the movement of the piston creating the pressure is increased in proportion to the generated pressure.

A further and still more specific object of the invention is the provision of an automatic valve for use in such by-passes which shifts to decrease the effective port area under an increased pressure in the pressure chamber.

A still further object of the invention is to provide a construction preventing the by-pass of the fluid employed in the shock absorber about the operating shaft employed to cause movement of the piston.

A still further object of the invention is to provide for use in conjunction with hydraulic shock absorbers having multiple pressure chambers means for regulating the maximum pressure which may be attained in one of the chambers.

These and other objects I attain by the construction illustrated in the accompanying drawings, wherein for the purpose of illustration I have shown my invention as applied to a hydraulic shock absorber of the rectilinearly movable piston type and wherein:—

Figure 1 is a vertical sectional view through a shock absorber embodying my invention;

Figure 2 is a transverse sectional view therethrough;

Figure 3 is a detail sectional view showing a modification of the automatic control of the relief port;

Figure 4 is a modification of the structure shown in Figure 3;

Figure 5 is a further modification providing a structure permitting the operation of the relief in one direction only;

Figure 6 is a still further modification showing how the automatic relief may be embodied in the piston structure.

Referring now more particularly to the drawings, the numeral 10 generally designates a cylinder having at one side a tubular extension 11 and provided with means, as at 12, whereby it may be secured to a vehicle frame. Reciprocatable within the cylinder is a piston 13, the side wall of which has formed therein a depression 14 across which extends a longitudinally directed web 15 having a notch, as at 16. A furcate arm 17 straddles the web and has a transverse pin 18 operating in this notch.

The arm at its opposite end is formed as a hub 19 and in alignment with the aperture of the hub, one wall of the tubular extension is provided with a bore 20, the outer end of which is enlarged, as at 21. The opposite wall of the extension is interiorly socketed as indicated at 22. The first named wall is interiorly bossed, as at 23, and the arm operates against this boss. Directed through the bore 20 and into the socket 22 is a shaft 23a, the outer end of which is enlarged, as at 24, to fit the enlargement 21 of the bore 20. Between the shoulder produced by the enlargement of the shaft and the shoulder produced by the enlargement of the bore, a packing 25 is arranged. The hub 19 has directed therethrough a set-screw 26 engaging against the inclined wall of a notch 27 formed in the shaft in such manner that the shaft is shifted longitudinally to compress this packing without the necessity of providing a packing gland. The shaft 23a constitutes a means for attaching an operating arm 28 which may be connected as by a link 29 with a second of two members, separation and approach of which is to be controlled by the cylinder. From the recess 14 to the head of the piston, a channel 30 is formed in the piston and this channel communicates with a bore 31 formed in the head of the piston. This bore in turn communicates with a transverse port 32 opening through opposite faces of the piston head.

Within this port is arranged a spring 33, opposite ends of which are connected with disks 34 forming valves for closing opposite ends of the bore against the intake of pressure.

The head of the piston may also have formed therethrough a second port 35 which is in communication with the port 32 through a bore 36. The port 35 is reduced adjacent one end, as at 37, to form an internal shoulder, while at its opposite end, it is provided with a removable ported plug 38.

A spring seats against the shoulder 37 and a second spring 39 against the plug 38 and between these springs is disposed a piston valve 40 which, by the tension of the springs, is maintained in alignment with and seals the bore 36. It will, however, be obvious that upon the introduction of sufficient pressure to the port 35, this piston will shift to uncover the bore 36 to place the port 35 in communication with the port 32.

Communicating with opposite ends of the cylinder 10 is a relief port 41 which, intermediate its ends, is enlarged, as at 42, to thereby form a shoulder 43. This enlargement is preferably eccentrically disposed with relation to the port 41 and opens through one end of the cylinder. In this enlargement are disposed in succession a centrally apertured flexible disk 44, a plug 45, a packing 46 and a gland follower 47 for compressing the packing against the plug. The face of the plug 45 next adjacent the disk is recessed, as at 48, and is in communication with a peripheral groove 49 formed in the plug through a port 50. The plug is centrally threaded for the reception of a needle valve 51 which passes through the gland to permit access thereto for adjustment. It will be obvious that since the disk 44 is flexible, if sufficient pressure is generated in the compression chamber 52, this pressure acting upon the disk, particularly in view of the fact that the area of the aperture 53 of the disk is reduced, as regards the area of the port 41, will be flexed and shift toward the needle valve, reducing the space between this valve and the edges of the opening, so that the effective port area is reduced and the resistance to the flow of fluid through the port 41 is accordingly increased.

Since the degree to which the disk is flexed is dependent upon the pressure generated in the chamber 52, the port area is inversely proportional to the generated pressure. Conversely, when pressure is generated in the chamber 54, this pressure tends to move the disk toward the shoulder 43, again reducing the effective port area, due to the fact that the ports are eccentrically disposed and accordingly the port 53 of the disk approaches the shoulder. The ports 41 and 53, however, overlap, so that no complete closure of the relief channel may take place.

In Figure 3, I have illustrated a modification of the structure just described. In this modification, instead of employing the shoulder 43 as a valve element with which the flexible disk coacts, I have provided a second needle valve 55 opposing the needle valve 51 and performing the functions of the shoulder 43. Since, in a construction of this character, there is a possibility of the disk coming into sealing engagement with one or the other of the valves, the disk is preferably formed with an additional minute port, indicated at 56, which forms a by-pass under such conditions.

In Figure 4, the structure is identical with that just described with the exception of the fact that the flexible disk is supplanted by a rigid disk 57 having springs 58 at opposite sides thereof which yield to permit movement of the disk toward one or the other of the needle valves. In many instances, it is desirable that the reduction of the port area occur during transmission of fluid only from one of the chambers 52 or 54 to the other thereof. Where this is the case, a construction such as shown in Figure 5 may be employed. In this structure, a rigid apertured disk 59 coacts with a single needle valve 51 and is urged from this needle valve by a spring 60.

The shoulder 43a in this construction is so formed that the disk may not come into sealing engagement therewith to obstruct the port area. In a structure of this character, the piston is preferably provided with a check valved port 61, the valve 62 of which seals the piston during its movement in a direction compressing fluid in the chamber where it may act when compressed to shift the disk 59. A convenient method of applying this check valve is that illustrated in this figure, wherein the check valve is in the form of a flat disk abutting one end of the port 61, which has attached thereto one end of a spring 63, the opposite end of which is secured to a cross bar 64 extending across the opposite end of the port.

A further method of accomplishing the automatic reduction of the available port area for transmitting fluid from one compression chamber to another is illustrated in Figure 6. In this illustration, a by-pass port 41a is of the usual character, having a needle valve 65 to regulate the effective area thereof. The wall of the piston 13 is provided with the port 33 and the bore 31 above described. Instead of employing the check valves at opposite ends of the port, a check valve 66 is employed at one end of the port only while at the opposite end thereof, a flexible undulate disk 67 is mounted. This disk under normal pressures will retain its undulate form and will accordingly permit fluid to pass to the port 33, so that it may escape by the valve 66 to the other of the compression chambers. If, however, the pressure becomes excessive, this disk will flatten, decreasing the effective area of or completely closing the port 33.

From the foregoing, it will be obvious that with a construction in accordance with my invention, excess pressures will result in reduction of the effective port area to increase the checking action, except under conditions where this pressure exceeds a safety point, at which time the valve 40 may shift to relieve such pressure.

Leakage is prevented by the fact that any fluid which may escape by the piston will collect in the tubular extension and be inducted through the channel 30, bore 31 and port 33 to the chamber 52 or 54 which is not under compression and in which, after any leakage, there will always be during a compression period a tendency to vacuum.

Since the construction illustrated may obviously be applied to other types of fluid checking apparatus than that employing the rectilinearly movable piston which is herein illustrated, I do not limit myself to such structure except as hereinafter claimed.

I claim:—

1. In a hydraulic shock absorber, a chamber, a means reversely movable therein, relief port means connecting opposite ends of the chamber, a tapering valve, and means including a cooperating disk-like member responsive to pressure between the reversely movable means and one end of the chamber reducing the effective area of said relief port means.

2. In a hydraulic shock absorber, a chamber, a means reversely movable therein, relief port means connecting opposite ends of the chamber, and a perforated disk moving in response to pressure generated between the reversely movable means and one end of the chamber to reduce the effective area of said relief port means.

3. In a hydraulic shock absorber, a cylinder, a piston shiftable therein, relief port means connecting opposite ends of the cylinder, and a flexible disk flexing under the influence of pressure generated between the piston and one end of the cylinder and when flexed reducing the effective area of said relief port means.

4. In a hydraulic shock absorber, a chamber, a means reversely movable therein, relief port means connecting opposite ends of the chamber, and a flexible disc responsive to pressure generated between the piston and either end of the chamber altering the effective area of said relief port means.

5. In a hydraulic shock absorber, a chamber, a means reversely movable therein, relief port means connecting opposite ends of the chamber and an undulate flexible disk moving in response to pressure generated between the reversely movable means and either end of the chamber to reduce the effective area of said relief port means.

6. In a hydraulic shock absorbr, a cylinder, a piston shiftable therein, relief port means connecting opposite ends of the cylinder and a disk flexing in opposite directions in response to pressure generated between the piston and opposite ends of the cylinder, said disk when flexed reducing the effective area of said relief port means.

7. In a hydraulic shock absorber, a cylinder, a piston shiftable therein, relief port means connecting opposite ends of the cylinder and a disk flexing in opposite directions in response to pressure generated between the piston and opposite ends of the cylinder, said disk having an opening forming a portion of said relief port means, there being valves at opposite sides of the disk which the disc approaches to thereby reduce the effective area of the opening of the disk.

8. In a hydraulic shock absorber, a cylinder, a piston shiftable therein, relief port means connecting opposite ends of the cylinder and a flexible disk flexing under the influence of pressure generated between the piston and one end of the cylinder and a valve which the disk approaches when flexed, the disk having an opening aligning with said valve and forming a portion of said relief port means.

9. In a hydraulic shock absorber, a chamber, a means reversely movable in the chamber to alternately generate pressure in opposite ends thereof, a port through the reversely movable head, check valves seating toward the head and closing opposite ends of the port, a second port opening through the reversely movable head, a bore connecting said ports, and a valve in said second port yieldably positioned to close communication between said second port and said bore, said valve shifting under the influence of a predetermined pressure within either end of said second port to place the second port in communication with the first port.

10. In a shock absorber and in combination, a cylinder, a piston reversely movable therein to alternately create pressure in opposite ends of the cylinder, means for operating said piston extended through the wall of the cylinder, an opening through the head of the piston, check valves closing opposite ends of said opening, and a duct communicating with said opening and with a space surrounding said operating means, said space being sealed from the remainder of the cylinder by said piston.

11. In a shock absorber, a chamber, a means reversely movable therein to alternately create pressure in opposite ends of the chamber, a relief port connecting opposite ends of the chamber, means reducing the effective area of the relief port upon the generation of pressure in either end of the chamber, and means relieving the pressure generated in either end of the chamber when it exceeds a predetermined amount.

12. In a shock absorber, a chamber, a means reversely movable therein to alternately create pressure at opposite ends of the chamber, a relief port connecting opposite ends of the chamber, means automatically reducing the effective area of the relief port upon generation of pressure between one end of the chamber and said reversely movable means and means automatically relieving said pressure when it exceeds a predetermined amount.

13. In a hydraulic shock absorber, a chamber, a means reversely movable therein, relief port means connecting opposite ends of the chamber, means responsive to pressure between the movable means and one end of the chamber reducing the effective area of said relief port means, and manually adjustable means for regulating the effective area of the relief port disproportionate to the movement of the adjustable means itself.

14. In a hydraulic shock absorber, a chamber, a means reversely movable therein, relief port means connecting opposite ends of the chamber, means responsive to pressure between the movable means and one end of the chamber reducing the effective area of said relief port means, and manually adjustable means for determining the extent to which the area of the relief port means is reduced by the first named means, and a member movable with respect to said adjustable means on a predetermined pressure.

15. In a hydraulic shock absorber, a cylinder, a piston shiftable therein, relief port means connecting opposite ends of the cylinder, a flexible disk flexing under the influence of pressure generated between the piston and one end of the cylinder and when flexed reducing the effective area of said relief port means, and manually adjustable means for determining the degree to which the disk must be flexed to reduce the relief port area through a predetermined extent.

16. In a shock absorber, a chamber, means reversely movable therein to create pressure in a portion of the chamber, a relief port connecting opposite sides of said movable means, means responsive to pressure created reducing the effective area of said relief port, said means having a perforation, and a taper-surfaced member, opposite such perforation.

17. In a shock absorber, a chamber, means reversely movable therein to create pressure alternately on the opposite sides of said movable means, a relief port connecting opposite sides of said movable means, means responsive to pressure created reducing the effective area of said relief port, and means relieving the pressure created on either side of the said reversely movable means when it exceeds a predetermined amount.

18. In a hydraulic shock absorber, a chamber, a means reversely movable therein, relief port means connecting opposite ends of the chamber and a disk flexing in opposite directions in response to pressure generated between the reversely movable means and opposite ends of the chamber, said disk when flexed reducing the effective area of said relief port means.

19. In a shock absorber and in combination, a chamber, a means reversely movable therein to alternately create pressure in the opposite ends of the chamber, means for operating said reversely movable means extending through the wall of the chamber, an opening through the head of the reversely movable means, check valves closing opposite ends of said opening, and a duct communicating with said opening and with a space surrounding said operating means, said space being sealed from the rest of the chamber by said reversely movable means.

20. In a shock absorber, a chamber, a means reversely movable therein, relief port means connecting opposite ends of the chamber, a flexible disk flexing under influence of pressure generated between the reversely movable means and one end of the chamber and when flexed reducing the effective area of said relief port means, and manually adjustable means for determining the degree to which the disk must be flexed to reduce the relief port area through a predetermined extent.

In testimony whereof I hereunto affix my signature.

FLOYD A. HUFF.